Figures 1, 4:
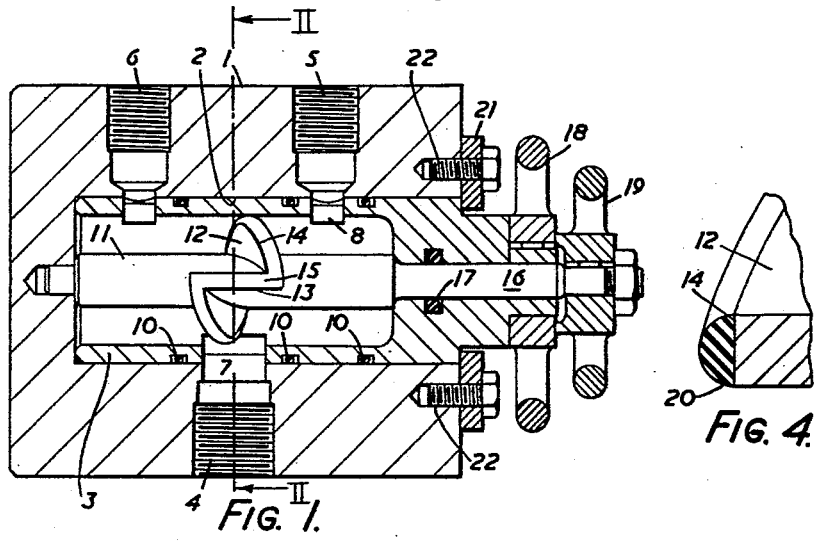

INVENTOR
CUTHBERT L. CHAMPION

United States Patent Office

3,136,339
Patented June 9, 1964

3,136,339
ROTARY 3-WAY HELICAL VALVE
Cuthbert Llewellyn Champion, London, England, assignor to Pickford Experimental Company Limited, Coventry, Warwickshire, England, a company of Great Britain
Filed Apr. 19, 1961, Ser. No. 104,096
Claims priority, application Great Britain Apr. 21, 1960
6 Claims. (Cl. 137—637.3)

This invention relates to three-way valves, that is to say valves either capable of blending the two flows respectively through two inlet ports so that the fluids therefrom flow together in desired adjustable proportions through a common outlet port, or of dividing the flow from a single inlet port in desired adjustable proportions between two outlet ports.

Known valves for this purpose tend to be expensive and their use thus tends to be limited to cases where the expense is regarded as justified, while in other cases separate valves are used to control the two ports through which the fluid flows in the same sense as for example, in the case of the common mixing unit used in kitchen sinks comprising separate hot and cold taps leading to a common delivery pipe.

An object of the invention is to provide the simple three-way valve of the kind in question which can be produced comparatively inexpensively and such that it can readily be made in forms having different flow characteristics to suit particular requirements, while a further object is to provide a form of such a valve in which the principal components at least can be readily manufactured from plastic materials and/or from metal.

A three-way valve according to the present invention comprises a valve chamber of circular cross-section about an axis, having a port (hereinafter called for convenience the common port) formed in its circumferential wall, and a valve member disposed within the chamber for rotation about said axis and having a helical controlling edge which lies adjacent to or in contact with the circumferential wall of the valve chamber and extends across the common port to divide this common port into two parts which respectively communicate with parts of the valve chamber on opposite sides of the said helical edge, the opposite ends of the helical edge being united by a barrier part, the edge of which also lies adjacent to or in contact with the circumferential wall of the valve chamber so as to co-operate with the helical edge in preventing communication between the said two parts of the valve chamber.

In a convenient form of valve member the helical edge will lie at the edge of a helical radially projecting flange formed on or secured to a rod or boss. Moreover, in many cases the helical edge will extend through approximately 360° about the axis of the valve chamber, so that the barrier edge extends in a direction parallel to such axis. It will be understood, however, that the barrier edge may also extend helically or otherwise.

In any case the two passages which communicate with the parts of the valve chamber on opposite sides of the barrier constituted by the helical edge and barrier edge and to or from which the fluid flowing through the common port flows may also pass through the circumferential wall of the valve chamber or be otherwise arranged.

The circumferential width of the common port may either be fixed, or may be adjustable, as for example by forming two opposite edges of the port on members which are capable of relative circumferential movement about the axis of the valve chamber.

Figures 2, 3:
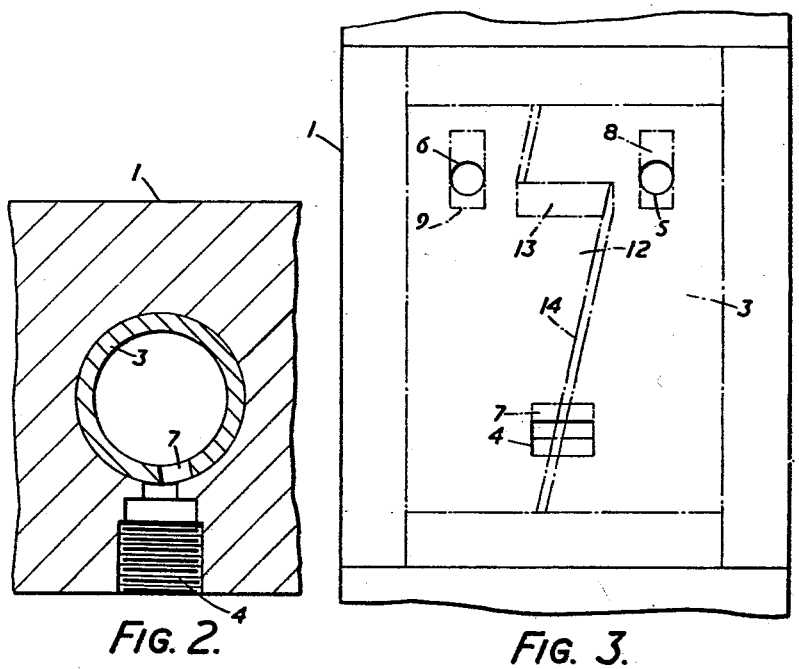

One construction according to the invention is shown by way of example in the accompanying drawings in which:

FIGURE 1 is a sectional side elevation in a plane containing the axis of the valve chamber, FIGURE 2 is a cross-section on the line II—II of FIGURE 1 with the valve member removed, FIGURE 3 is a diagrammatic development view showing the manner in which the helical edge operates, and FIGURE 4 shows a modification.

In the construction shown in FIGURES 1 and 2 the valve comprises a valve casing 1 having formed therein a cylindrical bore indicated at 2 within which is mounted to rotate a hollow cylindrical plug like valve housing 3 the bore of which constitutes the valve chamber.

For convenience, it will be assumed that the valve operates to divide the flow from a single inlet passage 4 formed in the valve casing 1 between two outlet passages 5 and 6 also formed in the valve casing 1.

The inlet passage 4 communicates with port 7 in the housing 3 while the two outlet passages 5 and 6 communicate with ports 8 and 9 in the housing 3, the housing 3 being capable of rotational adjustment within the case 1 within limits and the arrangement being such that the effective areas of the ports 8 and 9 remain unaltered or vary equally during such rotational adjustment within the permitted limits while the effective circumferential width of the port 7 is varied in the manner indicated in FIGURE 2. As shown, O-ring type seals are provided at 10 in grooves in the wall of the housing 3 to prevent flow of fluid between the passages 4, 5 and 6 through the clearance space between the housing 3 and the casing 1.

Supported within the housing 3 in the manner indicated is a shaft valve member comprising a shaft 11 having formed thereon a helical flange-like projection 12 the ends of which are united by an axially extending barrier wall 13 the edges 14 and 15 of the helical projection 12 and the barrier wall 13 lying in close proximity to or engagement with the circumferential wall of the valve chamber formed within the housing 3.

As will be apparent, the edge 14 of the helical projection 12 extends across the port 7 so that the helical projection 12 and the barrier wall 13 between them form a barrier separating the two ends 14 and 15 of the valve chamber and hence the ports 8 and 9 from one another and that the rotational position of the shaft 11 within the housing 3 determines the relative cross-sectional areas of the parts of the port 7 which communicate respectively with the port 8 and the port 9. The shaft 11 has a part 16 which projects through the closed end of the housing 3 as shown and is provided with an O-ring type seal 17 and has secured to its outer end a manually operable control wheel 18. A further manually operable control wheel 19 is provided on the outer end of the housing 3 to permit its ready rotational adjustment in the manner referred to above.

The edge 14 of the helical member 12 and the edge 15 of the barrier wall 13 may be provided with continuous sealing means, for example, in the form of a rubber or like resilient sealing member extending completely along these edges and either located in a groove therein or bonded thereto as indicated for example at 20 in FIGURE 4.

As will be seen, the housing 3 is maintained in position within the casing 1 by means of a retaining ring 21 secured to the casing 1 by bolts 22.

From FIGURE 3 it will be apparent that the proportions of flow through the port 7 which goes respectively to the ports 8 and 9 will be varied with rotation of the shaft 11 and that, by altering the helix angle of the helical member 12 and/or varying this helix angle over different circumferential ports, the law relating rotational movement of the shaft 11 to the distribution of flow between the ports 8 and 9 can be made to follow a large variety of laws. Also, by varying the effective width of the port 7 by rotational adjustment of the housing 3 by means of the handwheel 18 changes may be made in the volumetric rate of flow through the port 7 without necessarily altering the proportions of that flow which go respectively to the ports 8 and 9.

In a modification instead of having a separate housing 3 adjustably arranged within the casing 1, the casing 1 and housing 3 might be formed as one unit thus providing a simpler construction but one in which the dimensions of the port 7 are not adjustable.

In any case it will be readily understood that if the valve is connected up so that the passages 5 and 6 are inlet passages while the passage 4 is a common outlet passage, the valve can similarly be used to vary the proportions of the flow through the passage 4 derived respectively from the passages 5 and 6.

It will be understood also that although the valve chamber is not necessarily cylindrical but may be conical or of other form of circular cross-section about an axis.

Moreover the shape of the common port may vary to suit requirements. For example it may be in the form of a slot the longitudinal centre line of which is approximately at right angles to or inclined at some desired angle to the part of the edge of the helix which traverses it.

What I claim as my invention and desire to secure by Letters Patent is:

1. A valve comprising a valve chamber of circular cross-section about an axis having a common port formed in its circumferential wall, and a valve member disposed within the chamber for rotation about said axis and having a helical controlling edge which lies adjacent to or in contact with the circumferential wall of the valve chamber and extends across the common port to divide this port into two parts which respectively communicate with parts of the valve chamber which lies on opposite sides of said helical edge and are closed except that each has associated and communicating with it one further flow passage, the opposite ends of the helical edge being united by a barrier part the edge of which also lies adjacent to or in contact with the circumferential wall of the valve chamber so as to cooperate with the helical edge in preventing communication between the said two parts of the valve chamber.

2. A valve as claimed in claim 1, in which sealing means are provided extending continuously along the helical edge and the edge of the barrier part and making substantially fluid tight engagement with the circumferential wall of the valve chamber.

3. A valve as claimed in claim 1 in which the port across which the helical edge extends is of any approximately parallel-sided form.

4. A valve as claimed in claim 1 in which means are provided by which the effective dimensions of the common port can be varied.

5. A valve as claimed in claim 4, in which the common port has opposite edges thereof formed on separate members, one of which can be adjusted rotationally relative to the other to vary the circumferential width of said common port.

6. A valve as claimed in claim 5 in which the passages for flow of fluid to or from the two parts of the valve chamber communicate with such parts through ports in the circumferential wall of the valve chamber.

References Cited in the file of this patent

UNITED STATES PATENTS

| | | |
|---|---|---|
| 2,988,107 | Rudelick | June 13, 1961 |
| 3,037,527 | Elston | June 5, 1962 |

FOREIGN PATENTS

| | | |
|---|---|---|
| 418,431 | Germany | Dec. 24, 1939 |
| 1,238,684 | France | July 4, 1960 |